United States Patent [19]

Alexander

[11] Patent Number: 5,034,045
[45] Date of Patent: Jul. 23, 1991

[54] LIQUID CROP STIMULANT

[75] Inventor: William Alexander, Naperville, Ill.

[73] Assignee: American Colloid Company, Arlington Heights, Ill.

[21] Appl. No.: 513,092

[22] Filed: May 16, 1990

Related U.S. Application Data

[63] Continuation of Ser. No. 150,761, Feb. 16, 1988, abandoned, which is a continuation-in-part of Ser. No. 23,614, Mar. 9, 1987.

[51] Int. Cl.$^5$ .............................................. C05F 11/02
[52] U.S. Cl. .................................... 71/24; 71/DIG. 2
[58] Field of Search ............................ 71/24, DIG. 2

[56] References Cited

U.S. PATENT DOCUMENTS 4,440,560  4/1984  Nakamura et al. ...................... 71/24
4,588,431  5/1986  Nakamura et al. ...................... 71/24
4,698,090  10/1987  Marihart .................................. 71/24

OTHER PUBLICATIONS

CA 103 (11): 87079z, Rubinchik et al., 1985, "Production of Active . . . Phosphates", ZH. Prikl. Khim 58(4), 724-9.

Primary Examiner—Ferris H. Lander
Attorney, Agent, or Firm—Marshall, O'Toole, Gerstein, Murray & Bicknell

[57] ABSTRACT

A method of improving agricultural and horticultural crop yields utilizing a mixture comprising a water-soluble alkali metal salt of humic acid and a plant nutrient component including plant nutrients such as nitrogen and/or phosphorous and/or potassium. The addition of a liquid mixture comprising the plant nutrient component and a water-soluble alkali metal salt of humic acid to the growth medium or seed germination medium of agricultural or horticultural crops has demonstrated improved crop yields both in the size of the individual fruit and in the number of the fruit per plant.

22 Claims, 3 Drawing Sheets

THEORETICAL STRUCTURE OF HUMIC ACID

THEORETICAL STRUCTURE OF HUMIC ACID

OXIDATION SITES AVAILABLE FOR ADSORPTION OF NUTRIENTS AND MICRONUTRIENTS

EXCHANGE PREFERENCE FOR HUMIC ACIDS. SATURATED WITH POTASSIUM $Fe^{+++})Al^{+++})H^{+})Cu^{++})Ni^{++})Co^{++})Zn^{++})Fe^{++})Ca^{++})Na^{+})Mg^{++})K^{+})NH_4^{+})Li^{+}$

LIQUID CROP STIMULANT

CROSS REFERENCE TO RELATED APPLICATION

This is a continuation of application Ser. No. 7/150,761 filed Feb. 16, 1988 and now abandoned and which is continuation-in-part of copending application Ser. No. 23,614 filed Mar. 9, 1987.

FIELD OF THE INVENTION

The present invention relates to a method of improving the yield of various agricultural and horticultural crops. More particularly, the present invention relates to a method of improving the yield of agricultural and horticultural crops by utilizing a liquid comprising a water-soluble alkali metal salt of humic acid and a plant nutrient component including plant nutrients such as nitrogen and/or phosphorous and/or potassium. The water-soluble alkali metal salt of humic acid, particularly the potassium salt of humic acid, when applied in conjunction with the plant nutrient component, has demonstrated an unexpected ability to increase crop yields, both in regard to the number of fruit per plant and in regard to the size of the individual fruit. Surprisingly, the combination of a water-soluble alkali metal humic acid salt and a plant nutrient component including plant nutrients such as nitrogen and/or phosphorous and/or potassium showed a synergistic increase in crop yields compared to crop yields obtained using either the alkali metal humic acid salt or the plant nutrient component alone.

BACKGROUND OF THE INVENTION

Soil humus, consisting of organic residues from the decomposition of plant matter, is known as an important soil constituent for enhancing the growth of plants. The formation of soil humus depends upon an adequate supply of raw organic residues and upon suitable conditions for their decomposition. Should either condition be lacking, the eventual decrease in soil humus content leads to reduced soil fertility. In these cases, the addition of organic matter is necessary to increase the fertility of the soil.

Humic acid, defined as the portion of soil humus that is soluble in alkaline solution, but insoluble in acid solution, is the form of organic matter that often is added to the soil to increase fertility. Humic acid is found in rotting vegetable matter and can be detected in the black slime of an ordinary compost pit in a home garden. It also is found in the brown organic matter of a variety of soils, as well as in peats, manure, lignite, leonardite and brown coals. Humic acid does not have a single unique structure, but is a mixture of intermediate chemical products resulting from the decomposition and conversion of lignin and other plant materials to hard coal. Humic acid apparently is formed by the bacterial and chemical degradation of plant tissue, but in soils it also can be formed by certain secondary processes such as polymerization of polyphenols leached by rain from surface leaf litter, and condensation of phenols, quinones, and proteins that are provided by the action of soil micro-organisms and small animals on soil carbohydrates. As a result, humic acid is best characterized in terms of its origin and soil environment, rather than in rigid terms of chemical composition or chemical properties.

Humic acid has been used either as a soil amendment or as a fertilizer component to increase the fertility of soils. For instance, in U.S. Pat. Nos. 3,111,404, 3,264,084 and 3,544,295, Karcher discloses a complex and expensive method of producing a dry ammonium humate fertilizer by treating a humic acid-bearing ore, such as leonardite, first with phosphoric acid, then with ammonia, in order to extract the humic acid content. Burdick, in U.S. Pat. No. 2,992,093, teaches a similar extraction process yielding dry humates useful as soil conditioners and fertilizers. Particulate ammonium humate fertilizers are disclosed by Cooley in U.S. Pat. No. 3,418,100.

Another method of extracting humic acid from a humic acid-bearing ore is disclosed in U.S. Pat. No. 3,770,411 to Chambers, whereby a liquid humate product is obtained by reacting the ore with ammonia, then with phosphoric acid and, if desired, micronutrient elements. Schwartz et al in U.S. Pat. No 3,398,186 discloses using either an aqueous sulfate salt or a caustic soda solution as the extracting solution, followed by acidification to yield humic acid. In U.S. Pat. No. 3,076,291, Gardner teaches using ammonium, potassium, or sodium hydroxide to produce a humic acid-based seed germination promoter. Firth, in U.S. Pat. Nos. 4,274,860 and 4,321,076, discloses utilizing a humate derived from rutile sand deposits to stimulate growth in foliage plants. U.S. Pat. No. 4,319,041 to Goff discloses a method of forming a liquid humic acid product by mixing a humic acid-bearing ore, such as leonardite, with water and caustic soda.

The methods and compositions disclosed in the prior art are generally difficult and/or impractical to prepare and use. The disclosed methods are complex, involve large and expensive machinery, and usually produce granular materials. The prior art methods for producing the granular humates further suffer in that a substantial amount of the micronutrient elements essential to plant growth are extracted and removed during processing of the humic acid-bearing ore to a granular humic acid product. Methods of producing granular humates are also expensive, time-consuming, and require extra machinery to dry the humic acid product before packaging and use.

Therefore, it is highly desirable to provide a liquid humate product and thereby take advantage of easier storage, shipment, use and handling of a liquid product, of avoiding the extra step and cost of drying the product, and of direct application of the humate product by systems such as irrigation and spraying systems. However, the prior art methods of making liquid humates possess the serious disadvantages of low solids content and the presence of inactive and insoluble constituents. Consequently, several of the commercially available liquid humate products are only partially comprised of active humic acid solids, with the remainder of the advertised solids being inactive water-soluble constituents or inactive water-insoluble constituents that often plug irrigation and spray equipment.

Accordingly, it would be advantageous to provide a method of producing a highly concentrated aqueous solution of humates, such that insoluble constituents are minimized or eliminated and such that the solids content of the liquid is predominantly comprised of active humic acid salts as opposed to inactive soluble constituents. It also would be extremely advantageous to incorporate other additives, such as a plant nutrient component, into the liquid alkali metal humate product to dramatically increase the effects of the humate salt upon agricultural and horticultural crops. As a result, the amount of humate-containing product applied to the crop could be reduced in order to obtain the same crop yield, or the unreduced amount of humate-containing product could be applied to obtain superior crop yields.

Any method utilizing a liquid alkali metal humate in combination with additives to synergistically increase the effect of the humate would enhance and broaden the use of liquid humates in the agricultural and horticultural areas. Preferably any such method should utilize an economical, easy-to-manufacture liquid humate product possessing qualities that positively affect crop yield, such as number of fruit per plant and size per individual fruit.

BRIEF DESCRIPTION OF THE DRAWINGS

The invention both as to its organization and method of operation, together with further objects and advantages thereof, will best be understood by reference to the following specification taken in connection with the accompanying figure, in which.

SUMMARY OF THE INVENTION

Figure 1:
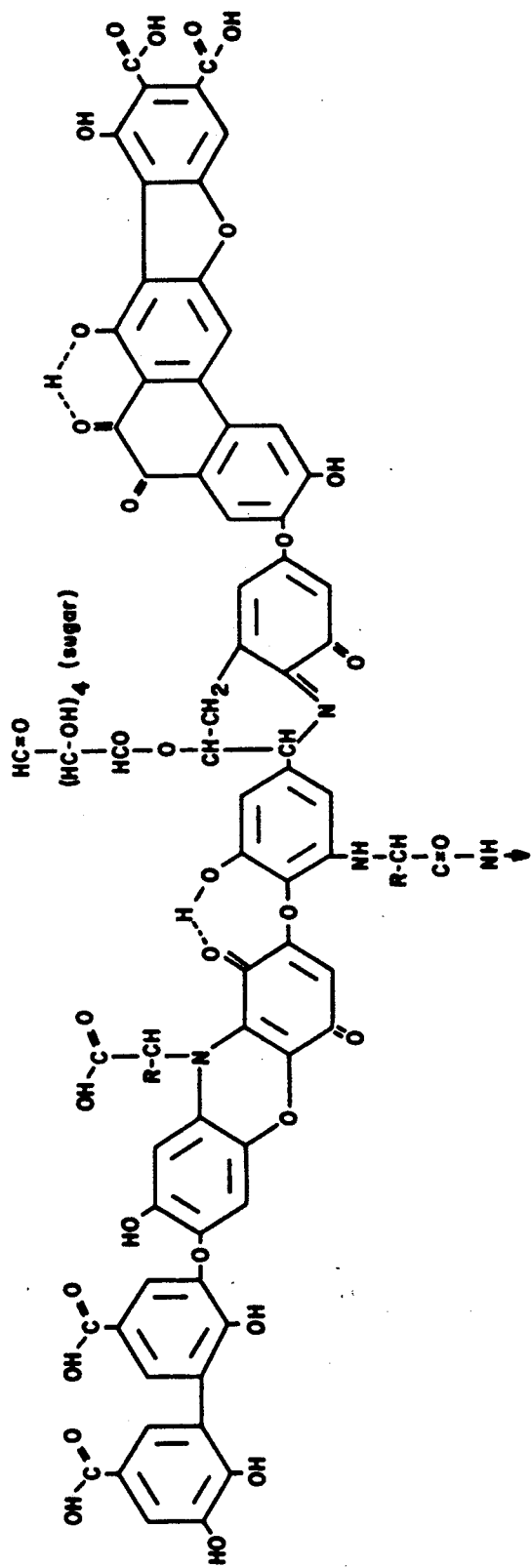
FIG. 1 is a proposed structure of humic acid.

In brief, the present invention is directed to a method of improving the yield of agricultural and horticultural crops by utilizing a mixture comprising a water-soluble alkali metal salt of humic acid and a plant nutrient component including such plant nutrients as nitrogen and/or phosphorous and/or potassium. Surprisingly, it has been found that both the number of fruit per plant and the size per individual fruit are unexpectedly increased by applying a synergistic amount of a plant nutrient component together with a water-soluble alkali metal humate salt to the growth medium or seed germination medium of the crop.

In accordance with the method of the present invention, a water-soluble alkali metal humate salt, formed from a humate-bearing ore, in combination with a synergistic amount of a plant nutrient component, can improve the crop yield of agricultural and horticultural crops. In regards to economics, ease of manufacture, ease of application and degree of improvement in crop yields, the method of the present invention is especially effective when the water-soluble alkali metal humate salt and the plant nutrient component, including plant nutrients such as nitrogen and/or phosphorous and/or potassium, is applied to the crop simultaneously as a mixture in the liquid form.

Therefore, the present invention is directed to a method of improving the crop yields of agricultural and horticultural crops with a liquid, water-soluble alkali metal humate salt in combination with a synergistic amount of a plant nutrient component. A liquid mixture, comprising a water-soluble alkali metal humate salt and a plant nutrient component including plant nutrients such as nitrogen and/or phosphorous and/or potassium applied to the growth medium or seed germination medium of the crop, surprisingly and unexpectedly exhibits increased crop yields for agricultural and horticultural plants compared to using a solution of the water-soluble alkali metal humate salt alone or using a solution of the plant nutrient component alone.

More particularly, the present invention is directed to a method of improving the crop yields of agricultural and horticultural crops utilizing about a 10% by weight to about a 15% by weight, for example, about 11% by weight to about 13% by weight and preferably about a 12% by weight, aqueous solution of an alkali metal humic acid salt that further includes from about 0% to about 20% by weight of nitrogen (calculated as N) and/or from about 0% to about 45% by weight phosphorous (calculated as $P_2O_5$) and/or from about 0% to about 20% by weight of potassium (calculated as $K_2O$) as a plant nutrient component. Compared to alkali metal humate salt solutions used alone, or plant nutrient component solutions used alone, the composition utilized in the method of the present invention has demonstrated a superior ability to increase the yield of agricultural and horticultural crops. The alkali metal humic acid salt solution, further including such plant nutrients as nitrogen and/or phosphorous and/or potassium, is generally applied to the crop as an aqueous solution including 1% by weight of the alkali metal humic acid salt to provide for example, about 0.1% by weight to about 2% by weight of the humic acid salt i the seed germination medium; more particularly about 0.4% by weight to about 1.5% by weight humic and salt. The aqueous solution is applied at a dosage rate such that the amount of alkali metal humic acid salt, calculated on a dry weight basis, does not exceed 10 lbs. of dry humic acid per acre. Exceeding this dosage rate may adversely affect the crop.

Without being limited to any particular theory or mechanism, it is suggested that the improved crop yield results are partially due to the method of manufacturing the alkali metal humic acid salt. This particular method of manufacturing an aqueous solution of an alkali metal humic acid salt provides a high percentage of active humate of up to about 15% by weight, without the formation of an appreciable amount of inactive water-soluble solids or inactive water-insoluble material, at a pH sufficient to attain maximum humate solubility and maximum stabilization of the hydrocolloidal alkali metal humic acid salts. The subsequent incorporation of a synergistic amount of a plant nutrient component into the aqueous humic acid salt solution further increases the agricultural and horticultural crop yields, both in regard to number of fruit per plant and in regard to size of individual fruit, compared to crop yield increases observed using a solution of the liquid humate salt alone or to a solution of the plant nutrient component alone.

Therefore, it is an object of the present invention to provide a method of increasing the yield of agricultural and horticultural crops. It is also an object of the present invention to provide a method of increasing the crop yield of agricultural and horticultural crops by utilizing a water-soluble alkali metal salt of humic acid.

Another object of the present invention is to provide a method of increasing the yield of agricultural and horticultural crops by utilizing a water-soluble alkali metal humic acid salt manufactured according to a method whereby the alkali metal humic acid salt is available as a concentrated solution of an alkali metal humic acid salt containing essentially no inert insoluble or inert soluble material.

Another object of the present invention is to provide a method of increasing the yield of agricultural and horticultural crops by utilizing a concentrated aqueous solution comprising an alkali metal humic acid salt and a synergistic amount of a plant nutrient component including such plant nutrients as nitrogen and/or phosphorous and/or potassium.

Another object of the present invention is to provide a concentrated solution, comprising an alkali metal humic acid salt and a synergistic amount of a plant nutrient component including such plant nutrient as nitrogen and/or phosphorous and/or potassium, of sufficiently high pH to maximize alkali metal humic acid salt solubility and stability.

Another object of the present invention is to provide a liquid plant stimulant to increase the yield of agricultural and horticultural crops both in regard to the number of fruit per plant and in regard to the size of each individual fruit.

Another object of the present invention is to provide a liquid plant stimulant manufactured from readily available ores, containing a large percentage of active humic acid, by an easy and economical process to yield a concentrated, aqueous alkali metal humic acid salt solution.

Another object of the present invention is to provide a method for increasing the crop yield of agricultural and horticultural crops whereby an aqueous solution of an alkali metal salt of humic acid, including a synergistic amount of a plant nutrient component including such plant nutrients as nitrogen and/or phosphorous and/or potassium, can be applied at relatively low application rates to afford improved results in root growth, color, growth rate, and seed germination in a relatively short period of time.

These and other objects and advantages of the present invention will become apparent from the following detailed description of the invention.

DETAILED DESCRIPTION OF THE INVENTION

Soil humus, because of its humic acid content, is an important soil constituent for enhancing the growth of plants. Humic acid promotes crop production by acting to bind sandy soils, loosening clayey soils, increasing the moisture-holding capacity of the soil, resisting the eroding action of wind, water and cultivation, storing and releasing macronutrient and micronutrient elements to the plants, and providing the conditions needed for optimal micro-organism growth. Overall, humic acid-containing humus offers the best medium for plant growth. Therefore, for soils deficient in humic acid, it is necessary to add various forms of organic matter to enhance the ability of the soil to act as a growth medium.

One of the most common organic adjuvants added to soil is humic acid itself. Although humic acid is derived from several sources, such as lignite, leonardite, peat and manure, the preferred source of humic acid is leonardite. Leonardite, usually found in ore deposits that overlay lignite coal deposits, is a highly oxidized form of lignite containing a higher oxygen content than lignite. The areas of greatest lignite coal oxidation lie along the outcrops at the surface of the leonardite overlay, and it is humic acid derived from these highly oxidized outcrops that are used most advantageously in the method of the present invention. These highly oxidized leonardite ores yield humic acid of a very high activity, making the ores an ideal raw material since the humic acid can be extracted with the best cost/benefit ratio.

Figure 2:
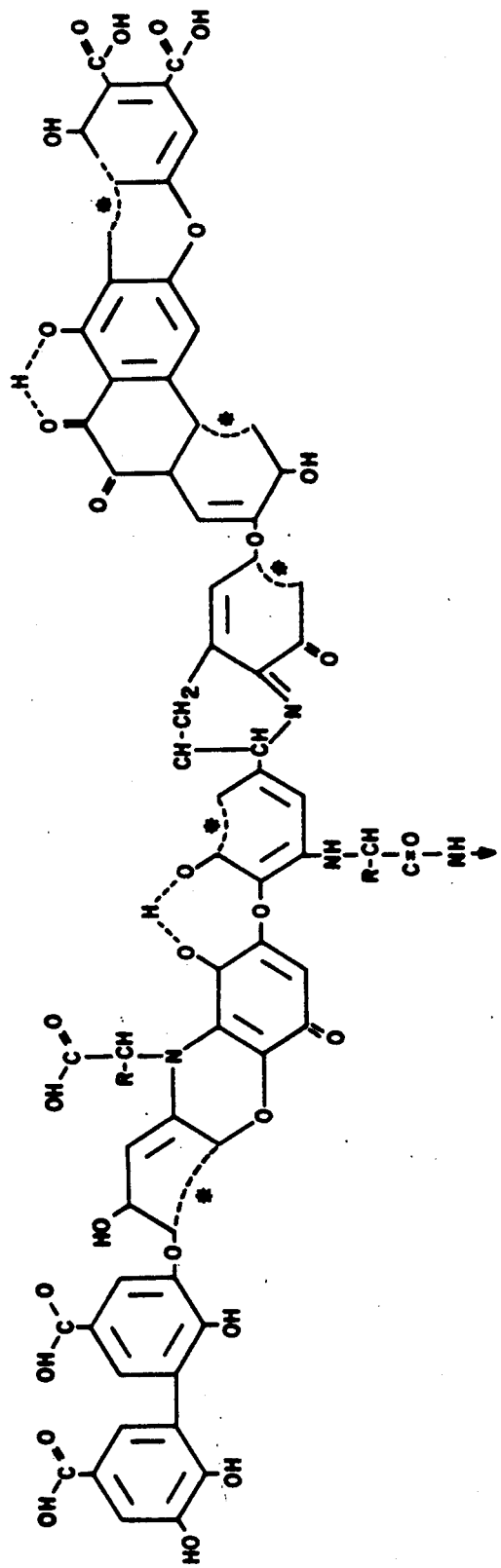
FIG. 2 is the chemical structure of humic acid showing the oxidation sites available for adsorption of plant nutrients and micronutrients.

The North Dakota leonardite used to obtain the humic acid used in the method of the present invention is defined by the U.S. Bureau of Mines as "essentially salts of humic acids". The humic acid derived from this North Dakota leonardite differs from the theoretical formula of humic acid illustrated in FIG. 1 because part of the humic acid structure has been oxidized, leaving sites for cation absorption by the resultant negative charge. This oxidized structure is generally illustrated in FIG. 2, wherein the oxidized sites are depicted by asterisks.

Chemical studies of the composition of leonardite have revealed that it is mainly composed of the mixed salts of acid radicals found in soil humus, a product of the decay of organic matter that contains both humic and nonhumic material. Such acid radicals are collectively termed "humic acids", having individual fractions named humin, humic acid, ulmic acid and fulvic acid. The exact structure of the humic acids are unknown. However, humic acids appear to be associations of molecules forming aggregates of elongated bundles of fibers at low pH, and open flexible structures perforated by voids at high pH. These voids, of varying dimensions, trap organic or inorganic particles of appropriate electronic charge.

The humic acids have a large cation exchange capacity and hold monovalent and multivalent elements, such as macronutrient and micronutrient elements, very strongly. The molecular weight of the humic acids range from 800 to 500,000, with the weight average molecular weight ranging from about 5,000 to about 50,000. The cation exchange capacity of the humic acids varies from about 200 to about 600 meq $CaCO_2$ per 100 grams at pH 7, depending upon the origin of the extracted acids. Humic acids are polyelectrolytes and are believed to form complexes with clay particles thus enabling humic acids to bind monovalent and multivalent elements with great tenacity. When the cation exchange sites on the humic acid molecule are filled predominantly with hydrogen ions, the material, considered to be an acid, is insoluble in water. However, when the predominant cations at the exchange sites are other than hydrogen, the material is called a "humate". Humates of the monovalent alkali metals or ammonia are soluble in water, but the humates of most multivalent metals are insoluble.

Humic acids in the form of their ammonium salts are soluble in water and when mixed with soil, have been found to promote plant growth. Specifically, the ammonium humates increase root growth and root formation, deepen the color of leaves, flowers and fruit, increase branching at high application rates, and increase the volume of fruit obtained.

Such beneficial effects on plant growth make ammonium humates highly desirable. However, the ammonium salts of humic acid tend to lose ammonia via evaporation, leaving the insoluble humic acid behind. As a result, ammonium humate solutions do not possess the stability to make them viable as concentrated liquid growth-stimulating products. Therefore, in accordance with the method of the present invention, a non-volatile alkali metal cation is used to neutralize the humic acid and to produce a stable, concentrated liquid plant growth stimulant, based on a water-soluble form of humic acid.

Leonardite in its natural state is composed predominantly of insoluble calcium, iron and aluminum humates. The calcium content of leonardite is high, and accordingly, treatment with materials that remove the calcium and form inorganic, insoluble calcium salts increases the water-solubility of the humate. Although leonardite is an abundant source of humic acid, its utilization as a humic acid raw material has been limited due to the lack of a simple, efficient means of converting its humic acid content into soluble forms.

Previous attempts to extract the humic acid content of leonardite have involved inefficient and unsatisfactory processes. Usually the leonardite was made colloidal by ammoniation, however, with aging, the ammonia evaporated and the humic acid content again became insoluble. Additionally, the processing of the leonardite involved numerous steps, including separation of any insoluble material by a filtration process requiring the addition of large amounts of water, i.e., establishment of a slurry, thus necessitating the subsequent removal of relatively large volumes of water.

Figure 3:
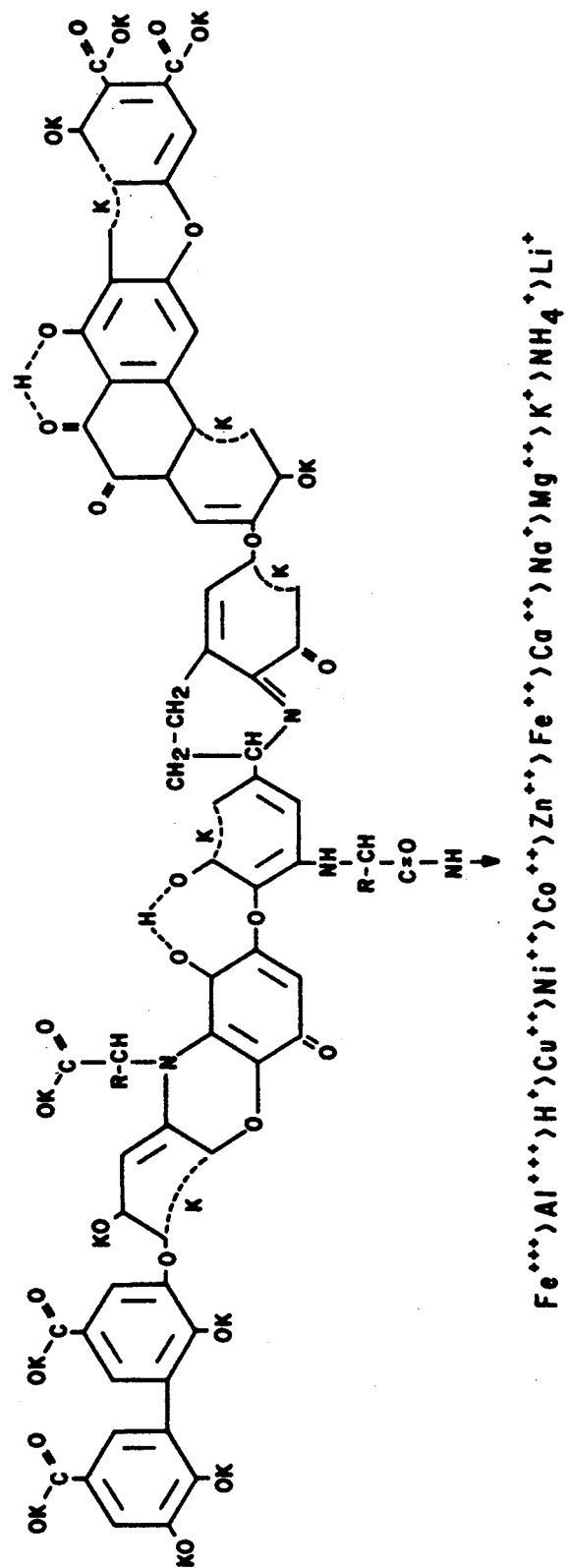
FIG. 3 is the chemical structure of oxidized humic acid saturated with potassium ions and a list of cations showing their relative exchange preference with humic acid.

According to the method of the present invention, the oxidized sites of humic acid are filled with non-volatile alkali metal ions that maintain the water-solubility of the humate salt. In particular, to produce a water-soluble alkali metal salt of humic acid that is suitable to enhance plant growth, leonardite is treated with an alkali metal hydroxide, such as lithium hydroxide, potassium hydroxide or sodium hydroxide. To achieve the full advantage of the present invention, the humic-acid bearing leonardite ore is treated with potassium hydroxide. By this method the oxidized sites of the humic acid are saturated with readily ion-exchangeable, nonvolatile alkali metal ions, such as potassium ions. In addition, using an alkali metal hydroxide to solubilize the humic acid allows the pH to be increased to the range of approximately 11, such that the maximum solubility of the humic acid salt is attained, and such that the humic acid hydrocolloids are stabilized in solution. The fully potassium-saturated humic acid structure, and the relative exchangeability of the cations found in the soil are illustrated in FIG. 3. The relative position of potassium shows that it will readily exchange with the secondary nutrient and micronutrient ions in the soil such as calcium, iron, aluminum, copper, nickel, cobalt, zinc and iron. By cation exchange of the potassium ion for the secondary nutrient and micronutrient element ions, the secondary nutrient and micronutrient elements then are available for uptake by the plant along with the humic acid. In addition, by exchanging the potassium ions for the secondary nutrient and micronutrient ions present in the soil, the released potassium ions of the humate salt provide the further benefit of introducing a primary nutrient into the soil.

The source of leonardite used to produce the water-soluble alkali metal salt of humic acid of the present invention is important in that the leonardite should contain a high percentage of active humic acid. All humic acid-bearing ores contain inactive ingredients such as clay, shales, gypsum, silica and fossilized organic matter. However, it is desirable to minimize the amount of inactive materials present in the ore. It has been found that the percentage of inactive ingredients is lowest for ores mined from North Dakota leonardite deposit outcrops. For these humic acid-bearing ores, the contaminants account for only approximately 15% by weight of the humic acid-bearing ore. However, the remaining 85% by weight of the ore is not all recoverable humic acid. Some of the humic acid content is irreversibly combined with crystallized minerals, and some of the humic acid is polymerized into insoluble molecules, such as the heavier molecular weight analogs of humic acid, like ulmic acid and humin. Usually, approximately 50% dry weight of the humic acid-bearing ore can be converted into active humic acid. This is a relatively high percentage and is accomplished by adding an oxidizing agent, such as an aqueous solution of hydrogen peroxide, in addition to an alkali hydroxide, to the humic acid-bearing ore to facilitate liberation of the humic acid from the contaminants found in the ore. The inactive portion of the humic acid-bearing ore, including the insoluble and/or inorganic constituents, is allowed to separate and is filtered from the active, water-soluble alkali metal humic acid salt.

As previously stated, humic acid is a complex material and is comprised of several constituents having a wide range of molecular weights. Humic substances in general are defined according to their solubility and include fulvic acid, humic acid, hymatomelanic acid, ulmic acid and humin. For instance, fulvic acid is a fraction of soil organic matter, that, like humic acid, is soluble in dilute alkalis; but, unlike humic acid, is soluble in mineral acid. It is believed that fulvic acid has a simpler chemical structure than humic acid and is a percursor of humic acid. In accordance with an important feature of the present invention, the water-soluble alkali metal salt of humic acid obtained from the alkali metal hydroxide and oxidizing agent treatment of the humic acid-containing ore contains from about 3% to about 5% fulvic acid. It has been theorized that the shorter chain humic acid fractions and fulvic acid fractions can be absorbed by the plant wherein the acids are metabolized, and thereby release the bound macronutrient and micronutrient elements to the plant. These shorter-chained humic acid precursors therefore enhance the transport and transfer of plant primary and secondary nutrients and micronutrients from the soil to the plant. The medium chain length humic acid constituents are absorbed more slowly than the short chain humic acid and fulvic acid constituents; the long chain humate constituents, such as ulmic acid, essentially are not absorbed. The water-soluble humic acid salts obtained by the method of the present invention contain essentially none of these high molecular weight, insoluble humic acid constituents that do not promote plant growth.

In accordance with another important feature of the method of the present invention, an oxidizing agent, such as hydrogen peroxide, is included in the humic acid extraction process to act as a preservative to improve the shelf-life of the concentrated alkali metal humic acid salt solution. It has been theorized that the oxidizing agent also acts both to help separate the humic acid from the non-humate contaminants in the ore and to increase the amount of short- and medium-chain humate constituents at the expense of long-chain humate constituents. As mined, leonardite ore contains long-chain, medium-chain, and short-chain humates. However, during the extraction process, the oxidizing agents may attack and rupture the naturally occurring long-chain humate polymers and partially convert the long-chain polymers into medium- and short-chain length humate polymers.

It has been found that about 15% by weight is the maximum percent of high activity humic acid solids achievable in solution. As the percent solids content increases above approximately 15% by weight, the solution is too heavily saturated and the alkali metal humic acid salt begin to precipitate. Although some present day commercial liquid humic acid products claim to contain about 15% humic acid solids, these products are in reality mixtures of a small percentage of active humic acid salts, plus a greater percentage of inactive humic acid constituents and, ofentimes, insoluble particles. The inactive and insoluble constituents do not enhance plant growth, but possess the disadvantage of plugging irrigation and spray distribution equipment.

Humic acid products extracted from manure or peat generally are not as effective in absorbing micronutrient elements as the humic acid product made according to the method of the present invention. In addition, humic acid products derived from lignite will not provide substantial plant growth stimulation unless the humic acid has been partially oxidized, such that it resembles the humic acid derived from leonardite.

Obtaining humic acid by extracting a suitable humic acid-containing ore, such as leonardite, with an aqueous solution of sodium hydroxide is known. In the past, the humic acid content of the ore has been dissolved in the alkaline extracting solution, then separated from insoluble contaminants. The humic acid extract then is acidified and the humic acid precipitated from solution. By this method, the maximum amount of humic acid, as a sodium salt, dissolved in the strongly caustic extracting solution was about eight percent by weight. In addition, this process required large quantities of sodium hydroxide and water to recover humic acid in commercial operations.

A humic acid-containing solution, suitable for use in the method of the present invention, is made according to the method of Example 1. This potassium humate salt exhibits excellent water-solubility and is essentially free of inactive soluble materials or insoluble inorganic materials. The humic acid is solubilized with an alkali metal hydroxide, adjusted to a high degree of alkalinity, and treated with an oxidizing agent. Then the alkali metal humate salt is separated from insoluble and inert contaminants and used, either alone or in combination with other plant nutrient components, as a concentrated liquid growth stimulant. Additionally, the process of the present invention does not require the addition of ammonia or the acidification of the extract.

EXAMPLE 1

Leonardite, such as the type mined from the outcrops of lignite reserves in North Dakota, is ground to a fine powder. Then approximately 1750 lbs. of the ground leonardite is thoroughly dispersed in solution comprising approximately 9800 lbs. of water, 440 lb. of 90% potassium hydroxide and 5 gal. of 30% aqueous hydrogen peroxide. The mixture is heated to 180° F. and agitated for 4 hours to effect extraction of the humic acid from the ore and conversion of the humic acid to a water-soluble alkali metal humate salt. Periodic additions of potassium hydroxide may be made to maintain the pH between approximately 10 and 12, and preferably at a pH of approximately 11, to assure effective extraction and solubilization of the humic acid. After the approximately 4 hrs. of agitation, the mixture is transferred to a holding tank. Any insoluble material is allowed to settle from the aqueous potassium humate salt solution over a 30 to 40 day period. The insoluble material subsequently is filtered from potassium humate solution, or alternatively, the insoluble material is removed by centrifuging the mixture followed by removal of the insoluble material by filtration. The potassium humate salt solution then is adjusted to a final pH of approximately 10 to approximately 12, and preferably to a pH of approximately 11, by the addition of potassium hydroxide. The solution also is adjusted to a humic acid salt concentration of between approximately 10% and approximately 15% by weight, and preferably to a humic acid salt concentration of approximately 12% by weight, by the addition of water.

To illustrate the plant growth effects of the liquid alkali metal humate produced according to the method of Example 1, celery seeds were germinated in soil treated with the liquid alkali metal humate. The effects of humic acid-containing materials on seed germination are similar to those for a rooted plant and resemble the effects of indole butyric acid, a well-known agent for promoting and accelerating root formations of plant clippings by unknown mechanisms. It is theorized that humic acid-containing materials, carrying macrontient and micronutrient elements and water, move into the seed through the pore, and stimulate development of the seed. Seeds germinate faster in the presence of humic substances, but, more importantly, a higher percentage of seeds actually germinate.

In this particular celery experiment, conducted in Florida, 70% of the seeds germinated in soil treated with a 1% by volume aqueous solution of the potassium humate salt solution made according to the method of Example 1 compared to a 52% seed germination rate in untreated soil. This approximately 35% increase in the amount of seed germination reduces seed cost and allows more efficient utilization of seed plots. The stimulation of seed germination by the potassium humate salt-containing solution can compensate for unexpectedly cool or rainy conditions thereby providing a wider margin of safety for the grower.

Further experiments also demonstrated the ability of the alkali metal humate salt of the present invention to increase agricultural and horticultural crop yields. For example, TABLE I shows the improved crop yield of sweet corn plants achieved by adding an aqueous solution including 2% by volume of the 12% liquid potassium humate product made according to the method of Example 1 to the fluid sowing gel of the corn plants. Unexpected and surprising improvements in plant growth and stimulation are observed in that after 10 days only 10 plants emerged from the untreated sowing gel (Example 2), whereas 64 plants emerged after 12 days from the potassium humate treated sowing gel (Example 3), or a 540% increase in number of emerged plants. Crop yield improvements were also observed in the increased fresh weight and dry weight of each corn plant 22 days after emergence.

TABLE I
EFFECTS OF ADDING AN ALKALI METAL HUMATE SALT TO THE FLUID SOWING GEL OF "SWEETIE" SWEET CORN PLANTS

| EX. | TREATMENT | CONCENTRATION | FINAL EMERGENCE DAYS | NO. OF PLANTS | FRESH WEIGHT 12 DAYS (gm) | FRESH WEIGHT 22 DAYS (gm) | DRY WEIGHT 22 DAYS (gm) |
|---|---|---|---|---|---|---|---|
| 2. | Untreated | — | 10 | 10 | 0.36 | 5.33 | 0.34 |
| 3. | 12% Liquid Potassium Humate | 2.0% | 12 | 64 | 0.34 | 6.36 | 0.41 |

The addition of an alkali metal humate salt also advantageously affects the growth of horticultural and ornamental crops. TABLE II shows the beneficial effect of adding a sufficient amount of the 12% liquid potassium humate salt of Example 1 to the potting media of philodendron oxycardium, such that the potting medium includes a total of 0.1% by weight of the potassium humate salt. TABLE II shows a 24% increase in vine length after 3 months; and 28% increase in vine length, a 22% increase in fresh weight of plant foliage and a 78% increase in fresh weight of plant roots after 6 months. Furthermore, the plants, both after 3 months and 6 months, are of overall better commercial quality, as determined in empirical testing.

TABLE II
INFLUENCE OF AN ALKALI METAL HUMATE APPLIED TO POTTING MEDIA OF PHILODENDRON OXYCARDIUM

| EX. | TREATMENT POTASSIUM HUMATE (WT. PERCENT) | 3 MONTHS LENGTH VINE (CMS) | 3 MONTHS PLANT QUALITY | 6 MONTHS LENGTH VINE (CMS) | 6 MONTHS FRESH TOPS | 6 MONTHS WT. (GMS) ROOTS | 6 MONTHS PLANT QUALITY |
|---|---|---|---|---|---|---|---|
| 4. | 0.0 | 19.6 | 2.9 | 29.0 | 33.4 | 2.8 | 2.8 |
| 5. | 0.1 | 24.4 | 3.3 | 37.3 | 40.8 | 5.0 | 3.8 |

(Plant Quality: 1 = poor; 3 = saleable; 5 = excellent.)

The alkali metal humate salt of the present invention also was compared to other seed treatments and biostimulants to determine the effect of the treatments on the total number and total weight of a carrot crop. TABLE III shows that treating carrot seeds with a solution including 1% by weight of a potassium humate provides improved crop yields in regard to total number of carrot plants and especially in regard to the total weight of the carrot crop. Examples 6 and 10 show the results for using different varieties of raw seeds. Example 7 shows the improvement by pregerminating the raw seeds of variety #1 in an aqueous solution including 1% of a potassium humate salt. Example 9 shows the improvement in total number of carrot plants and total weight by incorporating humic acid into the growing medium of the carrots. Example 8 shows the unexpected and surprising increase in the total weight of the carrots by incorporating a 1% by weight aqueous solution of the potassium humate made according to the method of Example 1 into the soil containing the carrot seeds. A 63% increase in total weight is observed over the experiment incorporating dry humic acid into the soil (Example 9), and a 135% increase in total weight is observed over the pregerminated carrot seeds of Example 7.

TABLE III
TOTAL NUMBER AND TOTAL WEIGHT OF CARROT CROP AS INFLUENCED BY VARIOUS SEED TREATMENTS AND BIOSTIMULANTS

| EX. | SEED TREATMENT | TOTAL NO. OF CARROT PLANTS | TOTAL WEIGHT (gr) |
|---|---|---|---|
| 6. | Raw seed #1 | 116 | 118 |
| 7. | Pregerminated/Gel | 222 | 281 |
| 8. | 12% Liquid Potassium Humate | 265 | 662 |
| 9. | Dry Humic Acid | 262 | 404 |
| 10. | Raw seed #2 | 104 | 142 |

In accordance with an important feature of the present invention, an alkali metal humate salt solution made according to the method of Example 1 can be mixed with a plant nutrient component, including such plant nutrients as nitrogen and/or phosphorous and/or potassium, to improve the yield of agricultural and horticultural crops. Nitrogen, phosphorous and potassium are known as the primary macronutrient elements required both as plant nutrients and to improve soil texture. The addition of the plant nutrients, such as nitrogen and/or phosphorous and/or potassium, to a solution of an alkali metal humic acid salt makes the plant nutrients more available to the plants through a more efficient transport mechanism attributed to the alkali metal humate sale. The plant nutrients therefore are more efficiently transported into the plant by with the alkali metal humate salt for more efficient use by the plant.

Surprisingly, TABLE IV shows that the mixture of a potassium humate salt and a plant nutrient component actually improves plant uptake of both the plant nutrients, such as nitrogen, phosphorous, and potassium, that are included in the mixture and improves plant uptake of the micronutrient elements that naturally occur in the soil. TABLE IV shows the improved plant uptake of primary nutrients and micronutrients in leaf tissue samples analyzed after 4 weeks of growth in soil treated with a solution including 12% potassium humate and a 6-14-14 plant nutrient component compared to plants grown in soil treated with only a 20-20-20 fertilizer. It is observed that using a lower analysis plant nutrient component (6-14-14) showed a greater nutrient uptake by the plant. In addition, the plant also took in greater amounts of the micronutrients, manganese, iron and magnesium, that were naturally found in the soil.

TABLE IV

PLANT NUTRIENT UPTAKE
(leaf analysis after 4 weeks growth)

| Element | 12% Potassium Humate and 6-14-14 Plant Nutrient | 20-20-20 Plant Nutrient |
|---|---|---|
| Nitrogen | 6.8% | 6.5% |
| Phosphorous | 0.72% | 0.59% |
| Potassium | 4.45% | 3.35% |
| Manganese | 0.52% | 0.48% |
| Iron | 220 ppm | 205 ppm |
| Magnesium | 400 ppm | 320 ppm |

The particular plant nutrient component added to the alkali metal humate salt is not particularly limited, however the plant nutrient component should be sufficiently water-soluble such that from 0% to about 20% of nitrogen (calculated as N), and especially from 0% to about 15% nitrogen; and/or from 0% to about 45% of phosphorous (calculated as $P_2O_5$), and especially from 0% to about 30% phosphorous; and/or from 0% to about 25% of potassium (calculated as $K_2O_5$), and especially from 0% to 15% potassium, can be incorporated into the alkali metal humate solution. However, it has been found that if the plant nutrient component is present above about 50% by weight of the entire composition, that plant nutrient components begin to precipitate out of solution. Therefore, the maximum amount of plant nutrient component that can be incorporated into the composition of the present invention is 50% by weight, and preferably the maximum amount of plant nutrient component present in the composition is about 30%. To observe the benefits and advantages of the present invention, the plant nutrient component should be present in an amount of at least 1% by weight of the total composition. Examples of plant nutrient components that possess sufficient solubility to be incorporated into the alkali metal humate salt solution, either alone or in combination, include, but are not limited to, ammonium nitrate, potassium chloride, ammonium phosphates, potassium phosphates, water-soluble polyphosphates, potassium hydroxide, potassium nitrate, potassium sulfate, sodium nitrate, potassium carbonate, ammonium sulfate, calcium nitrate and ammonium chloride.

Furthermore, it is expected that suitable amounts of micronutrients also could be included in the plant nutrient component of the liquid composition of the present invention in order to improve the crop yield of agricultural and horticultural crops. TABLE IV shows the improved uptake of micronutrients by plants where the potassium humate salt is incorporated into the soil. It is expected that any water-soluble micronutrient plant nutrient can be incorporated into the liquid potassium humate solution of the present invention. Such water-soluble micronutrient plant nutrients include, but are not limited to, the water-soluble salts of iron, boron, manganese, magnesium, copper, zinc, and molybdenum, like the sulfate, nitrate, chloride, oxide, carbonate, chelate, and borate salts of the micronutrient plant nutrients. Each of these micronutrient plant nutrients can be included in the liquid potassium humate salt in a sufficient amount to provide the particular crop with its micronutrient needs. Generally, a micronutrient element is present in the potassium humate solution in an amount of about 1% by weight or less, based on the weight of the micronutrient element, such as iron.

To further demonstrate the new and unexpected results achieved by the present invention, tomato plants were germinated in two fields, each treated with 200 lb/acre of nitrogen (as N) before planting. In one field, the preplant fertilization program also included incorporating 2 gallons/acre of the 12% alkali metal humic acid salt of Example 1 into the soil. TABLE V shows the beneficial effect provided by the potassium humate salt and nitrogen fertilizer combination on the crop yield of these drip irrigated fields. As illustrated in TABLE IV, the tomato plants of Example 12 were planted in the field treated with both the nitrogen fertilizer and the potassium humate salt, whereas the tomato plants of Example 11 were grown in a field treated only with the nitrogen fertilizer.

TABLE V

EFFECT OF 12% POTASSIUM HUMATE ON DRIP IRRIGATION OF TOMATOES

| EXAMPLE | PRE-PLANT N (LBS/ACRE) | 12% POTASSIUM HUMATE (GAL/ACRE) | YIELD-25 LB. BOX PER ACRE EARLY* | YIELD-25 LB. BOX PER ACRE TOTAL | FRUIT WT. OUNCES | PERCENT MARKETABLE FRUIT |
|---|---|---|---|---|---|---|
| 11. | 200 | 0 | 1242 | 2745 | 6.8 | 73.8 |
| 12. | 200 | 2 | 1491 | 3196 | 7.6 | 75.4 |

*Early - First three pickings.

From TABLE V it is observed that the early yield of 25 lb. boxes of tomatoes per acre increased 20% and the total yield of 25 lb. boxes of tomatoes per acre increased about 16% by treating the planting fields with both a liquid potassium humate salt and a fertilizer component including a nitrogen compound over a field treated only with the nitrogen fertilizer. Similarly, the weight per tomato and the percent marketable fruit increased.

TABLE VI further demonstrates the new and unexpected results provided by the method of the present invention, wherein the alkali metal salt of humic acid used in conjunction with a plant nutrient component increases both the number and weight of Heinz 1350 tomatoes. It is seen that

TABLE VI

EFFECTS OF ADDING 12% POTASSIUM HUMATE AND/OR 3-15-0 FERTILIZER TO FLUID SOWING GEL ON HEINZ 1350 TOMATOES

| EXAMPLE | TREATMENT | CONCENTRATION | NUMBER RED | WEIGHT RED KG | NUMBER GREEN | WEIGHT GREEN | TOTAL WEIGHT |
|---|---|---|---|---|---|---|---|
| 13. | Untreated | | 71.40 | 10.14 | 150.00 | 15.86 | 26.00 |
| 14. | 3-15-0 Fertilizer | 160 ppm $P_2O_5$ | 92.20 | 13.13 | 190.80 | 18.70 | 31.83 |
| 15. | 12% Potassium Humate | 1.0% | 106.20 | 15.71 | 208.60 | 20.91 | 36.63 |
| 16. | 12% Potassium Humate 3-15-0 Fertilizer | 1.0% + 160 ppm $P_2O_5$ | 110.20 | 16.36 | 237.00 | 24.24 | 40.59 | the addition of 3-15-0 plant nutrient (3% nitrogen, as N; 15% phosphorous as $P_2O_5$; and 0% potassium, as $K_2O$) alone to the fluid sowing gel increases the number of red and green tomatoes by 29% and 27% respectively (Example 14), and the addition of a 1.0% by weight of potassium humate, from a 12% potassium humate solution made by the method of Example 1, increases the number of red and the number of green tomatoes by about 48% and 39% respectively (Example 15). However, surprisingly and unexpectedly, treating the tomatoes with a solution including both the 3-15-0 plant nutrient component and the potassium humate solution demonstrated a 55% and a 58% increase, respectively, in the number of red and the number of green tomatoes (Example 16). Similarly, an increase of 56% in the total weight of the tomatoes is observed for tomatoes treated with both the 3-15-0 plant nutrient and the 12% potassium humate (Example 16), compared to a 45% increase in weight when only the 12% humate is used (Example 15), and a 22% increase when only the 3-15-0 plant nutrient is used (Example 14).

Similarly, Table VII illustrates the positive synergistic effect upon the yield of Heinz 1350 tomatoes by adding a 12% potassium humate salt and a 3-15-0 plant nutrient solution to the fluid sowing gel germination medium of the tomatoes. The addition of the potassium humate alone increased the number of tomato plants finally emerged (Example 18) but the total weight of the fruit and the total weight of fruit per plant was not significantly increased. However, Example 19, illustrating the addition of a solution including both an alkali metal humic acid salt and a 3-15-0 plant nutrient to the pregermination medium although showing a decrease in the total number of plants emerging also exhibited a substantial increase in weight per tomato of approximately 56%, and in number of tomatoes per plant of approximately 16% in comparison to tomato obtained from untreated Example 17. Furthermore, the addition of a liquid alkali metal humic acid salt and a 3-15-0 plant nutrient product to the fluid sowing gel shows increases of about 30% in total number of plants at harvest compared to the untreated tomato plants and of about 10% in total number of plants at harvest compared to tomato plants treated only with the 12% potassium humate solution.

TABLE VII

THE EFFECT OF ADDING 12% LIQUID POTASSIUM HUMATE AND/OR 3-15-0 FERTILIZER TO THE FLUID SOWING GEL ON EMERGENCE, GROWTH AND YIELD OF HEINZ 1350 TOMATOES

| EXAMPLE | TREATMENT | NO. PLANTS FINAL EMER. | TOTAL WT. FRUIT (KG.) | TOTAL WT. FRUIT PER PLANT (KG.) | NO. PLANTS AT HARVEST |
|---|---|---|---|---|---|
| 17. | Untreated | 14.40 | 26.00 | 2.24 | 11.80 |
| 18. | 12% Potassium Humate | 16.00 | 21.20 | 2.52 | 14.00 |
| 19. | 12% Potassium Humate + Fertilizer 3-15-0 | 14.80 | 40.59 | 2.60 | 15.40 |

(Average of five replications.)

Comparative tests performed on peppers are illustrated in Examples 20-23 of Table VIII. In these trials, the 9-45-15 (9% nitrogen, 45% phosphorous, and 15% potassium) plant nutrient and/or alkali metal humic acid salt solution were incorporated into a fluid sowing gel and applied to the transplant water of pepper plants. In regard to peppers, both the potassium humate salt and the 9-45-15 plant nutrient, when used alone, increased the fresh and dry weight of the tops and the dry weight of the roots (Examples and 22). However, the addition of a solution including the potassium humic acid salt and a 9-45-15 plant nutrient to the growth medium (Example 23) unexpectedly provided further yield increases.

TABLE VIII
EFFECTS OF ADDING POTASSIUM HUMATE AND/OR FERTILIZER TO THE TRANSPLANT WATER OF EARLY CALWONDER PEPPERS

| EXAMPLE | TREATMENT | CONCENTRATION | FRESH WEIGHT TOPS (GM) | DRY WEIGHT TOPS (GM) | DRY WEIGHT ROOTS (GM) |
|---|---|---|---|---|---|
| 20. | Untreated | | 5.24 | 0.65 | 0.49 |
| 21. | 12% Potassium Humate Salt | 2.0% | 6.13 | 0.77 | 0.52 |
| 22. | 9-45-15 | 4.0% | 13.10 | 1.39 | 0.65 |
| 23. | 12% Potassium Humate Salt + 9-45-15 | 2.0% 4.0% | 13.93 | 1.48 | 0.91 |

From TABLE VIII, the advantageous effect of adding both the liquid potassium humate and a 9-45-15 plant nutrient to the transplant water of Calwonder peppers, such that the transplant water contained 2.0% (v/u) of the 12% potassium humate and 4% of the 9-45-15 plant nutrient component, is most dramatically demonstrated in the dry weight of the roots. From Example 21, treating the pepper plants only with the potassium humate salt, the dry weight of the roots increases 0.03 g, or only about 6% over untreated control Example 20. Example 22, treating the plants only with the 9-45-15 plant nutrient, shows a 0.16 g increase in dry weight of the roots, or about a 32% increase. However, surprisingly and unexpectedly, Example 23, treating the pepper plants with both the potassium humate salt and the 9-45-15 plant nutrients gave a 0.42 g increase in dry root weight, or about an 86% improvement over the untreated control Example 20. Similar improved results are observed for the fresh and dry weights of the tops of the pepper plants.

Therefore, in accordance with an important feature of the method of the present invention, a concentrated liquid alkali metal humic acid salt-containing product can be combined with a plant nutrient component to substantially increase the yield of agricultural and horticultural crops. Surprisingly, it has been found that the alkali metal humic acid salt solution acts synergistically with the plant nutrient component to increase crop yields.

It is to be understood that the method of the present invention is intended to supplement, and not necessarily replace, the basic fertilizer needs of the various agricultural and horticultural crops. The liquid alkali metal humic acid salt product, made according to the method of the present invention, is not a fertilizer, but a complement to fertilizer. The fertilizer acts as the primary nutrient source for both plants and microflora, and the humic acid salt acts as a transport mechanism for moving the fertilizer and micronutrient elements from the soil to the plant. Therefore, the alkali metal humic acid salt product, made according to the method of the present invention, when used in conjunction with a fertilizer component, provides both the primary nutrients and/or micronutrients and a transport mechanism for those nutrients in an area, and in a sufficient amount, such that the plant can immediately make use of the nutrients. The plant nutrient is present in the seed germination medium or growth medium in an amount, for example, in the range of about 50 ppm to about 1000 ppm, e.g. 100 ppm to about 500 ppm of the medium. Humic acid and humate salts have the ability to absorb fertilizer components and regulate fertilizer release to plants, ultimately making the fertilizer more effective. As a result, judicious use of the highly-active liquid alkali metal humic acid salt products made according to the method of the present invention, in conjunction with plant nutrient components, including such plant nutrients as nitrogen and/or phosphorous and/or potassium and/or micronutrient elements, will improve plant growth performance in marginally fertile soils or soils with low native organic matter and will improve yields of crops grown in arid regions of the world.

The liquid alkali metal humic acid salt-containing product, made by the method of the present invention, plus the addition of a plant nutrient component, serves to assist the plant and the soil to more fully utilize both the included plant nutrient, the fertilizer added to the soil and the naturallyoccurring primary and secondary nutrients and micronutrients for improved plant growth and crop yields. The low percentages of alkali metal humic acid salt and plant nutrient components necessary to improve crop yields according to the method of the present invention, make the method easy and economical to implement, while making better use of agricultural resources through improved seed germination, nutrient use and crop yields.

The method of the present invention may be used on any seeds, and is not limited to a specific species. The method may be used to increase the crop yields of food crops such as soybeans, peas, potatos, eggplant, cucumbers, melons, squash, cabbage, cauliflower, small grains, sweet potatoes, peanuts, strawberries and citrus, in addition to the agricultural and horticultural crops illustrated in the Examples. The method of the present invention also may be used on non-food crops, such as tobacco, ornamentals, turf and for grass seeding cuts along highways.

It should be understood that the present disclosure has been made only by way of preferred embodiment and that numerous changes in details of construction, combination and arrangement of parts may be resorted to without departing from the spirit and scope of the invention as hereinunder claimed.

What is claimed and sought to be secured by Letters Patent of the United States is:

1. A method of improving the crop yield of agriculture and horticultural crops by adding to the seed germination or growth medium of the crop a liquid plant stimulant composition consisting essentially of a water soluble alkali metal salt of humic acid obtained from the alkali metal hydroxide treatment of an oxidized humic acid containing ore; an effective amount of a plant nutrient selected from the group consisting of ammonium nitrate; potassium chloride; ammonium phosphates; potassium phosphates; water-soluble polyphosphates; potassium hydroxide; potassium nitrate; potassium sulfate; sodium nitrate; potassium carbonate; ammonium sulfate; calcium nitrate; ammonium chloride; water-soluble salts or iron; water-soluble salts of boron; water-soluble salts of magnesium; water-soluble salts of copper; water-soluble salts of zinc; water-soluble salts of molybdenum; and mixtures thereof; and a suitable liquid carrier.

2. The method of claim 1, wherein the water-soluble alkali metal salt of humic acid is present in an amount of about 10% by weight to about 15% by weight of the composition, and is the lithium, sodium or potassium salt of humic acid, or mixtures thereof.

3. The method of claim 2, wherein the water-soluble alkali metal salt of humic acid is the potassium salt of humic acid and the composition has a pH of approximately 10 to approximately 12.

4. The method of claim 2, wherein the water-soluble alkali metal salt of humic acid is present in an amount of about 11% by weight to about 13% by weight of the composition.

5. The method of claim 1, wherein the plant nutrient is present in an amount of from about 1% by weight to about 50% by weight of the composition, and includes nitrogen, phosphorous or potassium; or mixtures thereof.

6. The method of claim 5, wherein the plant nutrient includes from 0% to about 20% by weight nitrogen, as N; from 0% to about 45% by weight phosphorous, as $P_2O_5$; or from 0% to about 25% by weight potassium, as $K_2O$; or mixtures thereof.

7. The method of claim 6, wherein the plant nutrient includes from 0% to about 15% by weight nitrogen, as N; from 0% to about 30% by weight phosphorous, as $P_2O_5$; or from 0% to about 15% by weight potassium, as $K_2O$; or mixtures thereof.

8. The method of claim 5, wherein the plant nutrient further includes a micronutrient element selected from the group consisting of iron, boron, manganese, magnesium, zinc, copper, and zinc; or combinations thereof.

9. The method of claim 8, wherein the micronutrient element is present in an amount of about 1% by weight or less.

10. The method of claim 1, wherein the liquid carrier comprises water.

11. The method of claim 1, wherein the liquid plant stimulant comprises from about 10% by weight to about 15% by weight of the water-soluble alkali metal salt of humic acid and from about 1% to about 50% by weight of the plant nutrient.

12. The method of claim 1, wherein the water-soluble alkali metal salt of humic acid is the potassium salt of humic acid.

13. The method of claim 1 wherein the water-soluble alkali metal salt of humic acid is present in the seed germination medium or growth medium in the range of about 0.1% by weight to about 2% by weight of the water-soluble alkali metal salt of humic acid.

14. The method of claim 13, wherein the water-soluble alkali metal salt of humic acid is present in the seed germination medium or growth medium in the range of about 0.4% by weight to about 1.5% by weight of the water-soluble alkali metal salt of humic acid.

15. The method of claim 14, wherein the plant nutrient is present in the seed germination medium or growth medium in the range of about 100 ppm to about 500 ppm of the medium.

16. A liquid crop stimulant consisting essentially of from about 10% by weight to about 15% by weight of an alkali metal salt of humic acid; from about 1% by weight to about 50% by weight of a plant nutrient selected from the group consisting of ammonium nitrate; potassium chloride; ammonium phosphates; potassium phosphates; water-soluble polyphosphates; potassium hydroxide; potassium nitrate; potassium sulfate; sodium nitrate; potassium carbonate; ammonium sulfate; calcium nitrate; ammonium chloride; water-soluble salts of iron; water-soluble salts of boron; water-soluble salts of mangnesium; water-soluble salts of copper; water-soluble salts of zinc; water-soluble salts of molybdenum; and mixtures thereof; and water, wherein the method of making the alkali metal salt of humic acid consists essentially of adding a crushed humic acid-containing ore to a mixture comprising an alkali metal hydroxide, an oxidizing agent and water; heating the aqueous mixture to a temperature of about 160° F. to about 200° F.; agitating the mixture for a time sufficient to obtain a solution of a water-soluble salt of humic acid; adding a sufficient amount of an alkali metal hydroxide to maintain the mixture of a pH from about 10 to about 12; separating insoluble materials from the alkali metal salt of humic acid; and adding water to adjust the amount of alkali metal salt of humic acid in the solution to about 10% by weight to about 15% by weight.

17. The composition of claim 16, wherein the humic acid-containing ore is leonardite.

18. The composition of claim 16, wherein the alkali metal hydroxide is lithium hydroxide, sodium hydroxide, potassium hydroxide or mixtures thereof.

19. The composition of claim 18, wherein the alkali metal hydroxide is potassium hydroxide.

20. The composition of claim 16, wherein the oxidizing agent is hydrogen peroxide, sodium perborate, sodium peroxycarbonate or mixtures thereof.

21. The composition of claim 20, wherein the oxidizing agent is hydrogen peroxide.

22. The composition of claim 16, wherein the alkali metal salt of humic acid is present from about 11% by weight to about 13% by weight.

* * * * *

UNITED STATES PATENT AND TRADEMARK OFFICE
CERTIFICATE OF CORRECTION

PATENT NO. : 5,034,045

DATED : JULY 23, 1991

INVENTOR : WILLIAM ALEXANDER

It is certified that error appears in the above-identified patent and that said Letters Patent is hereby corrected as shown below:

Column 18, lines 65-66, after "yield of" delete "agriculture" and substitute therefor -- agricultural --;

Column 19, line 10, after "salts" delete "or" and substitute therefor -- of --; and Column 20, line 40, after "mixture" delete "of" and substitute therefor -- at --.

Signed and Sealed this

Second Day of August, 1994

Attest:

BRUCE LEHMAN

Attesting Officer     Commissioner of Patents and Trademarks